C. W. CLARK.
YIELDING CONCAVE FOR THRESHERS.
APPLICATION FILED MAY 2, 1908.

918,285.

Patented Apr. 13, 1909.

Witnesses
Phil G. Barnes
J. W. Garner

Inventor
Charles W. Clark
By Victor J. Evans
Attorney

UNITED STATES PATENT OFFICE.

CHARLES W. CLARK, OF SIKESTON, MISSOURI.

YIELDING CONCAVE FOR THRESHERS.

No. 918,285.   Specification of Letters Patent.   Patented April 13, 1909.

Application filed May 2, 1908. Serial No. 430,552.

*To all whom it may concern:*

Be it known that I, CHARLES W. CLARK, a citizen of the United States, residing at Sikeston, in the county of Scott and State of Missouri, have invented new and useful Improvements in Yielding Concaves for Threshers, of which the following is a specification.

This invention relates to threshing machines or separators, and more particularly to concaves, therefore, and has for an object to provide means whereby the concave may be yieldingly supported beneath its cylinder whereby it may be automatically adjusted toward and away from the cylinder according to the amount of grain fed and its condition and to allow free passage of foreign matter.

A further object of this invention is to provide a concave as set forth above which will be simple in construction, which can be conveniently applied to machines of ordinary construction without change thereto and which will effectively serve to prevent clogging or choking between the cylinder and concave incident to the passing of a compact mass of heavy or wet grain.

A further object of this invention is to provide means whereby the concave may only yield at the time of a choke and which will remain in a fixed position under ordinary working or feeding of grain in its perfect condition.

Other objects and advantages will be apparent from the following description taken in connection with the accompanying drawings forming a portion of this specification, and it will of course be understood that changes in the specific structure may be made within the scope of the claim without departing from the spirit of the invention.

The invention is illustrated in the accompanying drawings, wherein like characters indicate similar parts in the several views.

Figure 1:
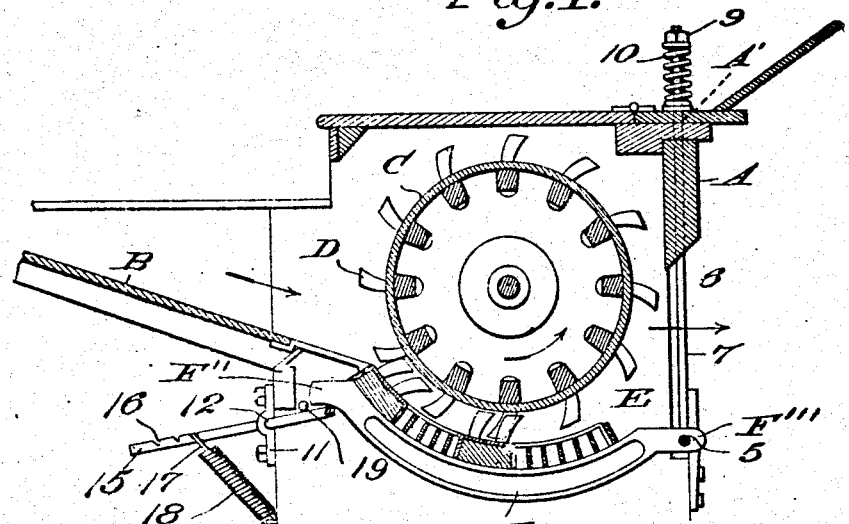
Figure 2:
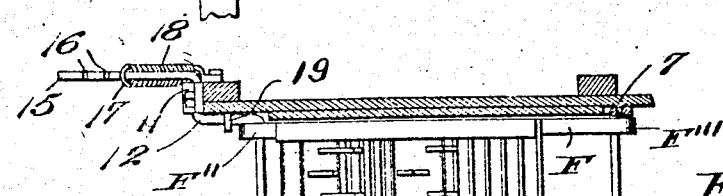
Figure 3:
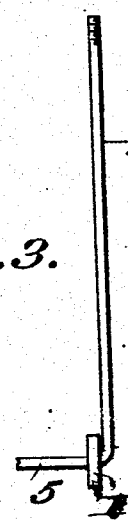

Figure 1 is a vertical longitudinal section, showing a portion of a threshing machine and the application of the present invention thereto. Fig. 2 is a horizontal section view, the cylinder being removed. Fig. 3 is a detail elevational view of a portion of the yoke.

Referring now more particularly to the drawings, there is shown a portion of a threshing machine casing A including a feed table B, of ordinary construction, and a transversely disposed threshing cylinder C having the usual teeth D, as shown.

A concave E is disposed beneath the threshing cylinder C and comprises parallel side bars F which are provided at their forward ends with horizontally disposed ears F" and at the rear ends, their arms are provided with similar ears F''' which are provided with horizontally disposed passages for the reception of the horizontally disposed portion 5 of a yoke 6. The yoke 6 at each end, is provided with a vertical rod 7 threaded at its upper end as shown at 8, and which thus receives a nut 9 for a purpose to be hereinafter described. Each vertical rod is thus located inwardly of the side walls of the casing A, and at the upper ends, these rods are disposed in passages formed in the top of the casing whereby they are mounted for vertical movement. Each rod thus receives a helical expansion spring 10 disposed between the top of the casing and the nuts 9 carried by the rods 7 and arranged to bear against the under sides of the nuts whereby the portion 5 of the yoke is held depressed at times against the tension of the springs for yieldingly supporting the rear end of the concave.

Beneath the platform B of the casing, and mounted at each side of the latter, there is shown a bearing 11 each of which receiving an outwardly directed portion 12 formed at each end of a crank member 13 having a horizontally disposed portion 14 which supports the front end of the concave and which is disposed with portions beneath the ears F'''. Each outwardly directed portion 12 of the crank member 13 is provided with a forwardly directed arm 15 each of which being provided with a plurality of transversely disposed and substantially V-shaped teeth 16 which receive the hooked ends 17 of coil retractile springs 18. It is thus obvious that the front end of the concave is yieldingly supported in a manner similar to that of the rear end. In order to limit the upward movement of the concave at the front end thereof, I provide each side of the casing A with a stop pin 19 whereby portions of the crank 13 are normally engaged therewith as will be seen from Fig. 2 of the drawings, and it will thus be seen that by the provision of the stop pins 19 the concave at one end will be limited in its upward movement toward the cylinder. By the provision of the toothed portions of the crank member 13 it will be understood that the springs may be engaged at different points to suit various occasions, and the teeth of the concave will be effectively held in spaced relation to the threshing cylinder.

The provisions of the nuts 9 is also such as to enable the concave at the rear end to be moved toward or away from the threshing cylinder.

A concave as herein set forth and described is simple in construction, and effectively serves to prevent damage to the machine incident to the choking between the cylinder and concave upon the introduction thereto of foreign matter, i. e. nails, overfeeding of grain or damp and heavy grain or the like. It will further be seen that the yoke 6 and the crank 13 as constructed by me are such that may be applied to concaves of any desired construction. The crank 13 and the springs 18 which are attached thereto normally work in opposition to the springs 10 and it will be readily apparent that the concave normally will act in conjunction to the cylinder in the ordinary manner, and will only yield upon the introduction of foreign matter or the like as previously described. It will be seen, that upon introducing material at the front end of the concave, the said concave will be free to move angularly with respect to the cylinder should the material be weighted or should it contain foreign matter, and after the material reaches the point directly beneath the center of the cylinder, the said concave will be moved vertically in a downward direction. It will be seen that by providing the ears F″ with passages for receiving the horizontally disposed portion 5 of the yoke 6 the concave is pivotally mounted at its rear end.

Having thus described the invention, what is claimed is:—

The combination with a threshing machine having a cylinder and a concave, of a yieldable yoke carried by the machine having a portion pivotally engaged with the concave at the rear end thereof, said yoke having threaded portions, adjusting nuts engaged with said threaded portions so that the yoke can be adjusted vertically, springs confined between the nuts and the top portion of said machine, a crank member carried by the machine supporting the concave at the front end thereof, spring means connected with the machine and with the crank member, and stops carried by the machine and located above the crank member for engaging the same to limit its upward movement.

In testimony whereof I affix my signature in presence of two witnesses.

CHARLES W. CLARK.

Witnesses:
M. G. GRESHAM,
E. J. MALONE.